Nov. 17, 1970 R. L. YACHABACH 3,541,262
POST PAY TELEPHONE CONTROL UNIT
Filed May 10, 1968 2 Sheets-Sheet 1

INVENTOR.
RONALD L. YACHABACH
BY
[signature]
ATTORNEYS

INVENTOR.
RONALD L. YACHABACH
BY
ATTORNEYS

United States Patent Office 3,541,262

Patented Nov. 17, 1970

3,541,262

POST PAY TELEPHONE CONTROL UNIT

Ronald L. Yachabach, Lakeland, Fla., assignor to Teltronics, Inc., Lakeland, Fla.

Continuation-in-part of application Ser. No. 688,091, Dec. 5, 1967. This application May 10, 1968, Ser. No. 728,152

Int. Cl. H04m 17/02

U.S. Cl. 179—6.3 7 Claims

ABSTRACT OF THE DISCLOSURE

A pay telephone control unit for preventing conversation when the telephones are first connected to each other and permitting conversation after the deposit of appropriate coins, includes a first relay for closing switches to prevent transmission of conversation over either the transmitter or the receiver of one of the telephones in response to current reversal which occurs as the telephones become connected, a rectifying diode shunting current around said relay before the current reverses and for directing current through the relay after current reverses, a coin-operated switch unit which de-energizes the first relay and permits the conversation obstruction switches to open upon deposit of appropriate coins, a magnet to keep the switch open during the conversation, a second relay to return the switch to its initial position after completion of the call.

CROSS-REFERENCE TO RELATED APPLICATION

This application is a continuation-in-part of my copending application Ser. No. 688,091, filed Dec. 5, 1967.

BACKGROUND OF THE INVENTION (1) Field of the invention.—This invention relates to a pay telephone control unit and more particularly to a control unit which may be substituted in conventional pay telephones for a known prior art unit which places a conversation obstruction means into the telephone circuit when the parties first reach each other, and which removes the obstruction after the deposit of an appropriate coin.

(2) Description of the prior art.—The present invention represents an improvement over the control unit disclosed in Pat. No. 1,844,684 issued to Theodore C. Riebe on Feb. 9, 1932. This unit is widely used in rural areas in the United States to place an obstruction to conversation into the line as soon as the called party answers and to remove the obstruction after the calling party deposits an appropriate coin or coins to pay for the call.

The Riebe device operates in response to a change in direction of line polarity which occurs as the calling telephone reaches the called telephone. This current reversal is used to energize an electromagnet to rotate an armature to a position at which certain spring electrical contacts may close. This short-circuits the transmitter thus making it impossible for the calling party to talk to the called party and shunts a resistance across the receiver to make it impossible for the calling party to use the receiver as a transmitter. Deposit of an appropriate coin or coins releases a mechanical linkage which, under the influence of spring action, short-circuits the electromagnet and opens switches to remove the transmitter short circuit and the receiver shunt from the line. Upon completion of the call and return of line polarity to its initial direction, another electromagnet is energized to return the armature to its initial position. Under the influence of gravity and spring actions, parts of mechanical and electrical contacts are returned to their initial position.

The use of these mechanical parts and spring actuation of electrical contacts requires approximately a dozen adjustments so that the device will satisfactorily operate. Accordingly, installation and maintenance of the unit requires a considerable expenditure of skilled labor.

SUMMARY OF THE INVENTION

Briefly stated the present invention includes electromechanical elements mounted on a printed circuit board which may be substituted for the device disclosed in the said Riebe patent. The elements include a first relay for preventing conversation between the parties by closing contacts which short-circuit the transmitter and shunt a resistance across the receiver to prevent its use as a transmitter, a rectifying diode connected in parallel with the first relay to pass current around the relay while current flows in its initial direction and to direct current through the relay when current reverses as the telephones are connected to each other. A lever mounted on the unit extends into the coin chute of the telephone and is moved by deposit of appropriate coins to open an electrical switch to cut off power supply to the first relay to permit opening of its contacts and conversation between the parties. A permanent magnet holds the coin-operated lever in its open position until a second relay returns it to its initial position after completion of the telephone call. Movement of the lever upon deposit of appropriate coins closes a contact to connect the second relay to the power source, but a second diode mounted in parallel with the second relay prevents passage of current through the second relay until current returns to its initial direction after completion of the call.

OBJECTS OF THE INVENTION

Among the objects of the present invention is the provision of a telephone control unit which does not require extensive mechanical adjustment thereby reducing the cost of installation and maintenance.

A further object of the invention is the provision of an all electrical unit for placing conversation obstruction means into a pay telephone circuit when the parties first reach each other, for removing the conversation obstruction means upon deposit of coins, and for returning the system to its initial condition upon completion of the call.

Other objects and advantages of the invention will be apparent from the following description considered in conjunction with the accompanying drawings.

DESCRIPTION OF ONE EMBODIMENT OF THE INVENTION

Figure 1:
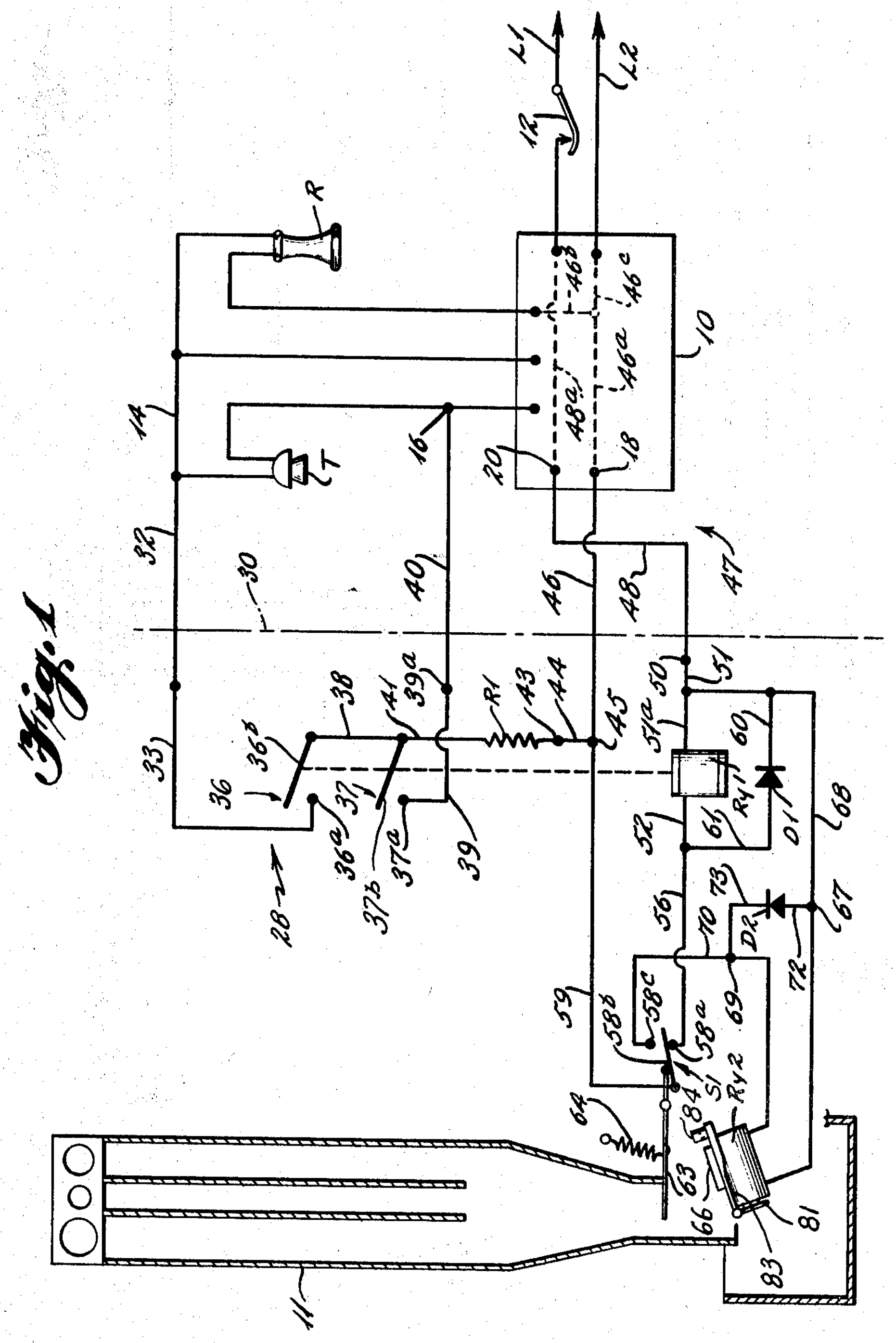
FIG. 1 is a schematic diagram illustrating the electrical connections of the elements of the present invention, other elements of the telephone and its circuit being shown in schematic fashion.
Figure 2:
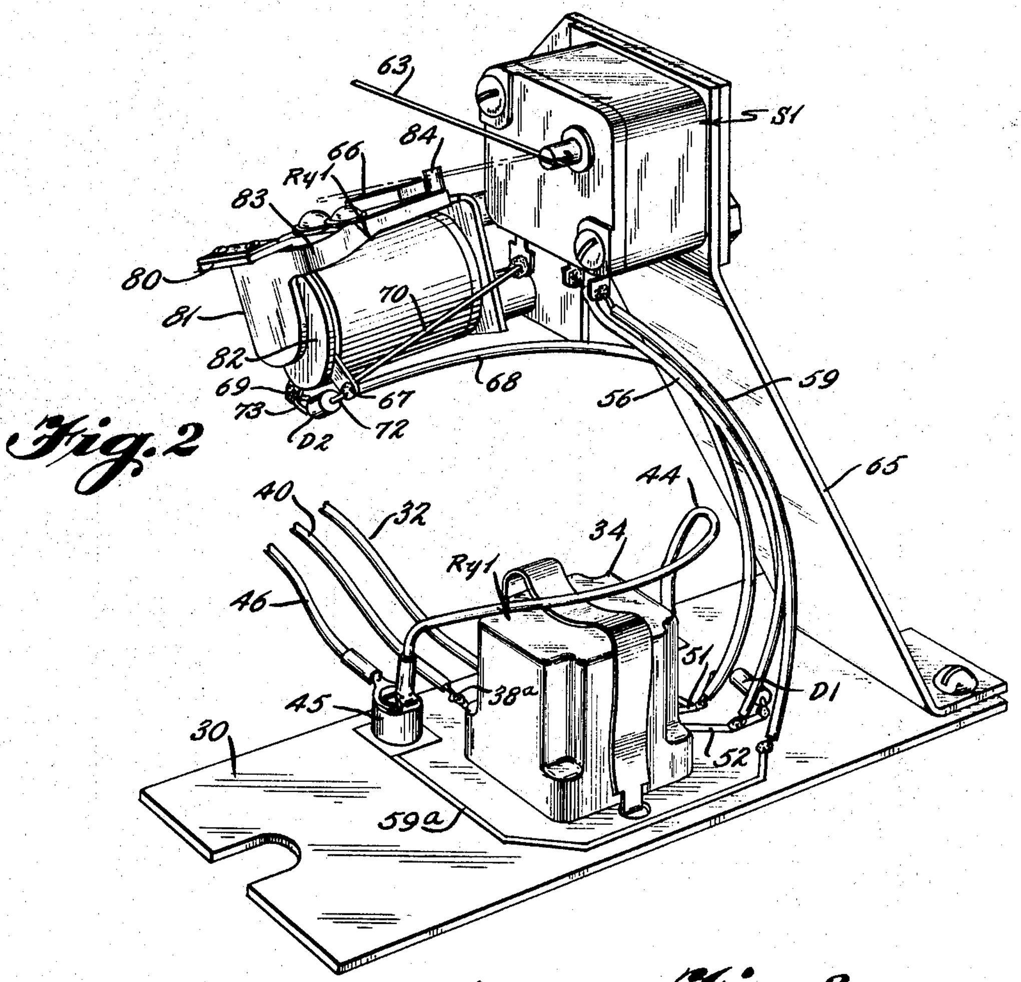
FIG. 2, a perspective illustrating certain of the elements of the invention mounted upon a printed circuit board.
Figure 3:
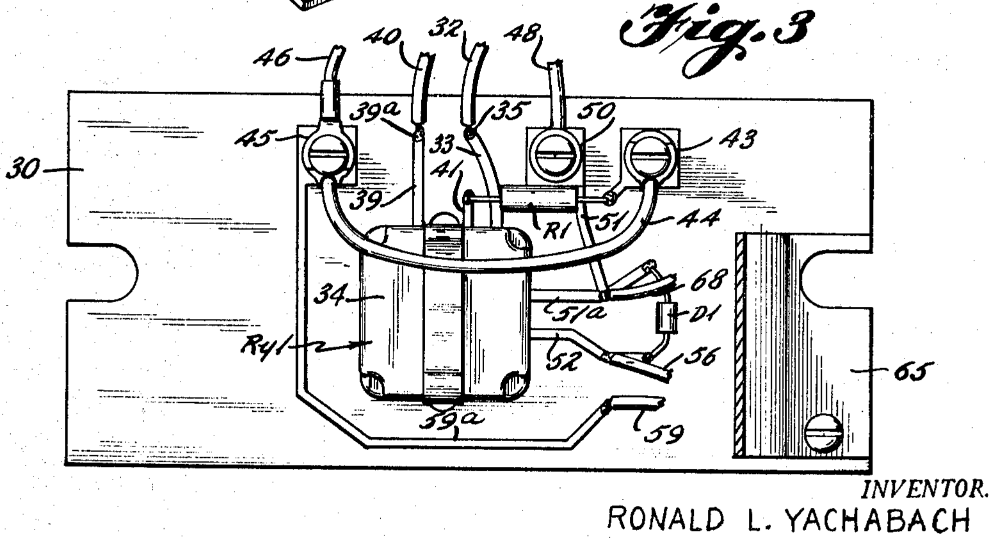
FIG. 3, a plan view of the device of FIG. 2.

With reference to the drawings, FIG. 1, the present invention is described as connected to a conventional pay telephone unit, the model LPB 86 manufactured by the Automatic Electric Company, which includes a coin chute 11, a transmitter T, a receiver R, internal telephone circuitry 10 and power leads L1 and L2. Connected in power lead L1 is a hook-controlled switch 12 which is open when a transmitter-receiver handset rests on the hook and automatically closes when the handset is removed. The model LPB 86 telephone includes terminals to which the electrical leads of the units described in the aforementioned Riebe patent are connected. These include a transmitter-receiver common terminal 14, a transmitter terminal 16, a power terminal 18 which the telephone manufacturer designates as the No. 1 induction coil lead and a power terminal 20 which the manufacturer designates as the No. 2 transfer spring. Terminals 18 and 20 are connected by internal telephone circuitry elements to the power leads L2 and L1, respectively. Those skilled in the telephone art will readily recognize the equivalents of terminals 14, 16, 18 and 20 in other models of conventional telephones.

The elements of the present invention are mounted on a printed circuit board 30 and include a wire 32 extending from the transmitter-receiver common terminal 14 to a conversation obstruction circuit 28 including a terminal 35, a printed lead 33 connected to a switch contact **36*a* of a relay Ry1. Relay Ry1 is a commercially available unit described in U.S. Pat. No. 2,881,365 including a pair of switches 36 and 37 having switch contacts 36*a* and 37*a*, each with associated switch arms 36*b* and 37*b* which are normally biased to the open position and which are closed when the relay is energized. The relay is mounted in a case 34 on the circuit board 30 with switch arms 36*b* and 37*b* in electrical contact with a printed lead 38. Switch contact 37*a* is connected via printed lead 39 and terminal 39*a* on the circuit board and then via a wire 40 to the telephone transmitter terminal 16. The conversation obstruction circuit also includes a printed lead 41 connected to printed lead 38 and to which is connected a shunt resistor R1. The other end of shunt resistor R1 is connected to a terminal 43 on the circuit board. A wire 44 extends from terminal 43 on the circuit board to another terminal 45 on the circuit board. A wire 46 extends from terminal 45 to the telephone induction coil terminal 18 which is connected via internal telephone circuit elements 46*a* and 46*b* to receiver R**.

The circuit board also includes a power supply circuit 47 for relay Ry1. This circuit includes internal telephone circuit elements **48*a* connecting power supply lead L1 to the telephone transfer spring terminal 20. A wire 48 extends from terminal 20 to a terminal 50 on circuit board 30 from which extends printed lead 51. The coil relay Ry1 is connected to lead 51*a*, an extension of lead 51, at one end and to printed lead 52 on the circuit board at the other. A wire 56 extends from lead 52 to a contact 58*a* of a coin-operated switch unit S1. A wire 59 extends from the switch arm 58*b* associated with switch contact 58*a* to a printed lead 59*a* which is connected to terminal 45 on the circuit board. The power circuit 47 is completed to power lead L2 through internal telephone circuit elements 46*a* and 46*c*. The coil relay Ry1 is shunted by wires 60 and 61 connected to leads 51 and 52, respectively, and a rectifying diode D1**.

Coin-operated switch unit S1 includes a lever arm 63 and a spring means 64 biasing lever arm 63 to its upper position. Switch arm **58*b* is connected to lever arm 63 so that as the lever arm moves, it also moves from contact 58*a* to another contact 58*c*. Unit S1 is mounted on a bracket 65 which is, in turn, mounted on circuit board 30. Also physically mounted on bracket 65 is a second relay coil Ry2. A permanent magnet 66 is fixed to the side of relay coil Ry2 beneath a mid-point of lever arm 63. Circuit board 30 and bracket 65 are so positioned in the telephone that lever arm 63 projects within telephone coin chute 11**.

Relay coil Ry2 includes a terminal 67 which is electrically connected by a wire 68 to printed lead 51 on the circuit board. A second terminal 69 at the one end of the relay coil Ry2 is connected via wire 70 to switch contact **58*b*. Rectifying diode D2 is connected to terminals 67 and 69 via wires 72 and 73, respectively. Mounted on relay coil Ry2 is a pivoted armature 80 having a base 81 which is drawn to the pole piece 82 of the relay when the relay is energized. Also fixed to base 81 is a rocker arm 83 which extends toward magnet 76 and has a striker 84 fixed to its free end in a position to engage the lever arm 63 and lift it from the permanent magnet 66** when the relay coil is energized.

OPERATION OF THE DEVICE

Before a telephone call is placed, hook switch 12, switch arms **36*b* and 37*b* of relay coil Ry1, lever arm 63, and switch arm 58*b* of the coin-operated switch unit S1 are in the positions illustrated in FIG. 1. Power lead L2 has a negative potential and power lead L1 has a positive potential. Removal of the transmitter-receiver handset from the hook closes hook switch 12 and supplies power to the telephone circuit. Current flows from the negative power lead L2 to telephone terminal 18, wire 46, wire 59, switch arm 58*b*, switch contact 58*a* and wire 56 to relay coil Ry1. However, current bypasses relay Ry1 through diode D1 and continues through wire 48 to the telephone No. 2 transfer spring terminal 20 and to power lead L1**.

When the called party answers, the potential of leads L1 and L2 is reversed either by operation of automatic equipment or by the operator. Current flows in the opposite direction, but now passes through relay coil Ry1 since diode D1 blocks passage of shunting when current flows in this direction. Energization of relay coil Ry1 moves switch arms **36*b* and 37*b* into engagement with their associated contacts. Transmitter T is then short-circuited via wire 32, printed lead 33, switch 36, printed lead 38, switch 37, printed lead 39 and wire 40. Resistor R1 is shunted across the receiver R via wire 32, lead 33, switch 36, lead 38, on one side of the resistor, and wires 44 and 46 and internal telephone circuit elements 46*a* and 46*b*** on the other. This shunting resistance makes it impossible to use the receiver as a transmitter.

Deposit of appropriate coins into the coin chute 11 rotates lever arm 63 into engagement with permanent magnet 66 and moves switch arm **58*b* from contact 58*a* to contact 58*c***. Conventional circuit elements, not here described, are included in the telephone system to prevent actuation by inappropriate coins.

Current flow through relay coil Ry1 ceases and switches 36 and 37 are biased to their open position. This removes the short across the transmitter and removes resistor R1 from the receiver circuit and permits conversation.

Movement of switch arm **58*b* to contact 58*c* also connects relay coil Ry2 to the telephone power terminals 18 and 20. However, diode D2 shunts current across the relay so long as the telephones remain in contact and the current flows in the reverse direction. When current returns to the initial direction upon completion of the call, diode D2 blocks passage of current flowing in this direction, and the current accordingly flows through relay coil Ry2. Movement of the base 81 of the armature towards pole piece 82 moves rocker arm 83 and striker 84 to a position in which it pushes lever arm 63 away from permanent magnet 66. Lever arm 63 returns to its initial position under the influence of spring means 64**.

This return of current to the initial direction occurs while the calling party is on the line if the called party hangs up first. However, if the calling party hangs up first and opens hook switch 12, current flows through relay coil Ry2 occurs when the transmitter-receiver handset is lifted from the hook switch for the next call.

It will be apparent that there has been provided a control unit for pay telephones of the post pay type which is primarily electrical in its operation and which requires little or no mechanical adjustment of its parts so that, accordingly, installation and maintenance costs are reduced.

What is claimed is:

1. Apparatus for use in a pay telephone system in which current flows in one direction when the calling and called telephones are not in electrical contact, and in a reverse direction when contact is established comprising conversation obstruction means including a first relay means for shorting out the calling telephone upon the reversal of electric current, switch means for deactivating said first relay means and removing said short when appropriate coins are deposited, magnetic means for holding said switch means in short removing position, second relay means for returning said switch means to shorting position before another call can be made, and rectifying means for preventing operation of said second relay means while line current is flowing in said reverse direction.

2. The structure of claim 1 including second rectifying means for preventing passage of electrical current through said first relay means while line current is flowing in said one direction.

3. The structure of claim 2 in which said second rectifying means is a diode mounted in parallel with said first relay means.

4. The structure of claim 1 in which said switch means includes a lever bar mechanically connected to said switch means and extending into the coin chute of the pay telephone system.

5. The structure of claim 1 in which said magnetic means is a permanent magnet.

6. The structure of claim 1 in which said rectifying means is a diode connected in parallel with said second relay means.

7. The structure of claim 1 in which the elements are mounted on a circuit board on which the circuit contacts and leads are printed with a conductive material.

References Cited

UNITED STATES PATENTS 2,820,847 1/1958 King ---------------- 179—6.3

KATHLEEN H. CLAFFY, Primary Examiner

J. S. BLACK, Assistant Examiner